(12) United States Patent
Shearer et al.

(10) Patent No.: US 10,013,776 B2
(45) Date of Patent: *Jul. 3, 2018

(54) UNITARY SHADOWS

(71) Applicant: Apple Inc., Cupertino, CA (US)

(72) Inventors: James J. Shearer, San Francisco, CA (US); Christopher P. Wright, Cupertino, CA (US); Ryan N. Armstrong, San Jose, CA (US); Chad E. Jones, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,869

(22) Filed: May 5, 2017

(65) Prior Publication Data

US 2017/0249757 A1    Aug. 31, 2017

Related U.S. Application Data

(63) Continuation of application No. 14/502,903, filed on Sep. 30, 2014, now Pat. No. 9,679,396.

(60) Provisional application No. 62/005,866, filed on May 30, 2014.

(51) Int. Cl.
*G06T 11/00* (2006.01)
*G06T 11/60* (2006.01)
*G06T 1/60* (2006.01)

(52) U.S. Cl.
CPC ............. *G06T 11/001* (2013.01); *G06T 1/60* (2013.01); *G06T 11/60* (2013.01)

(58) Field of Classification Search
CPC ......... G06T 11/001; G06T 1/60; G06T 11/60; G09G 5/397

USPC .......................................................... 345/589
See application file for complete search history.

(56) References Cited

U.S. PATENT DOCUMENTS

| 5,870,097 | A | 2/1999 | Snyder | |
|---|---|---|---|---|
| 6,694,486 | B2 | 2/2004 | Frank | |
| 7,023,438 | B2 | 4/2006 | Lokovic | |
| 7,439,975 | B2 | 10/2008 | Hsu | |
| 7,714,858 | B2 * | 5/2010 | Isard | G06T 15/04 345/419 |
| 8,384,738 | B2 * | 2/2013 | Mercer | G06F 9/4443 345/421 |

(Continued)

OTHER PUBLICATIONS

Zhang, Fan, "Parallel-Split Shadow Maps for Large-scale Virtual Environments," 2006, ACM, pp. 311-318, Retrieved on Oct. 2, 2017, Retrieved from internet <http://dl.acm.org/citation.cfm?id=1128975>.

*Primary Examiner* — Barry Drennan
*Assistant Examiner* — Terrell Robinson
(74) *Attorney, Agent, or Firm* — Blank Rome LLP

(57) ABSTRACT

Methods, devices, systems, and computer readable media to improve the operation of window-based operating systems are disclosed. In general, techniques are disclosed for rendering areas on a display in which two or more shadows overlap. More particularly, two or more shadow regions (based on the arrangement of overlapping windows/shadows) are identified and merged in a top-down process so that no region's shadow is painted or rendered more than once. A shadowbuffer (analogous to a system's framebuffer) may be used to retain windows' alpha information separately from the corresponding windows' shadow intensity information.

21 Claims, 7 Drawing Sheets

(56) References Cited

U.S. PATENT DOCUMENTS

2003/0058241 A1* 3/2003 Hsu .................. G06T 15/60
                                                    345/426
2010/0058229 A1   3/2010 Mercer
2010/0141658 A1   6/2010 Danton
2013/0135309 A1   5/2013 King

* cited by examiner

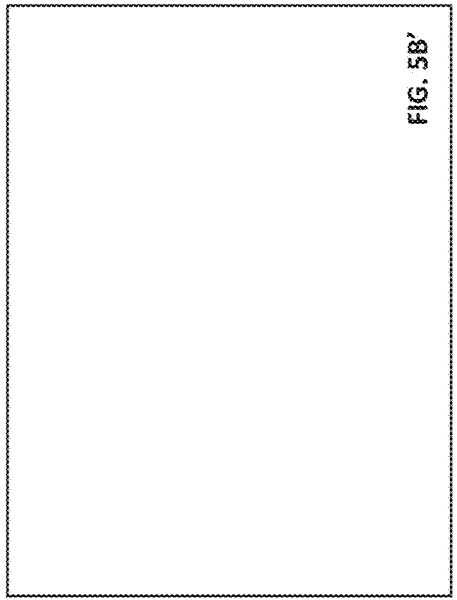
SHADOWBUFFER ALPHA CHANNEL 330
500
FIG. 5B
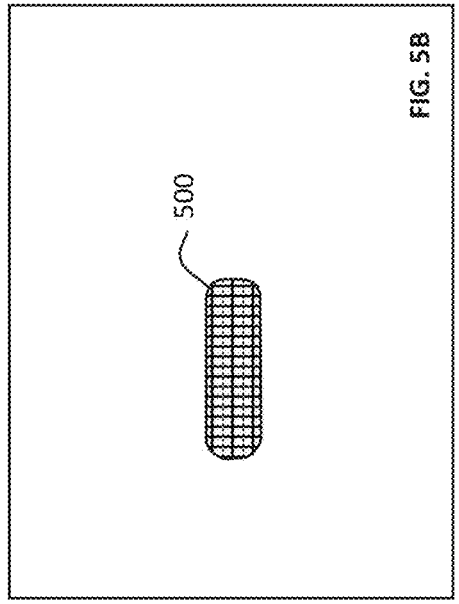
SHADOWBUFFER SHADOW CHANNEL 335
FIG. 5B'
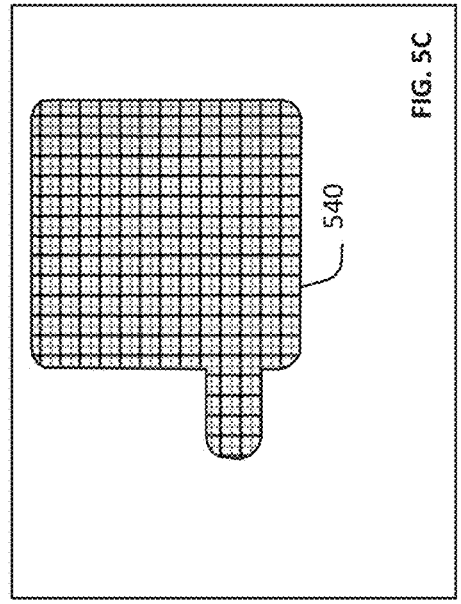
540
FIG. 5C
545
BASED ON MIDDLE
WINDOW'S SHADOW—
ABOVE REGION
FIG. 5C'

SHADOWBUFFER ALPHA CHANNEL 330

SHADOWBUFFER SHADOW CHANNEL 335

BASED ON BOTTOM WINDOW'S SHADOW—ABOVE REGION

SHADOW REGION AROUND 550

UNITARY SHADOWS

BACKGROUND

This disclosure relates generally to the field of window displays. More particularly, this disclosure relates to collecting and displaying shadows associated with overlapping windows.

Many modern windows-based operating systems provide a user interface based on a "desktop" paradigm. These operating systems present information (text and graphics) to users through windows as displayed against, or on top of, a desktop. Often, each window casts a shadow as a visual aid to help the user distinguish spatially close or overlapping windows. In general, shadows are part of their corresponding window and are often pre-generated, being laid-down or rendered immediately before/beneath their corresponding window. In this approach regions in which shadows overlap are re-painted each time a shadow is rendered to that region. This leads to shadow areas that are too dark to mimic reality. This situation is illustrated in FIG. 1 in which three overlapping windows are shown: bottom window 100, middle window 105, and top window 110—each having its own shadow (each, separately, identical). As windows overlap so too do their shadows. In regions 115 and 120 only a single shadow has been rendered—these regions are the lightest shadow regions. Shadows have been rendered twice in regions 125 and 130 and in region 135 the shadows from all three windows overlap. As shown, regions 125 and 130 are darker than single-shadow regions 115 and 120, but lighter than triple-shadow region 135.

DETAILED DESCRIPTION

This disclosure pertains to systems, methods, and computer readable media to improve the operation of window-based operating systems. In general, techniques are disclosed for correctly rendering areas on a display in which two or more shadows overlap. More particularly, two or more shadow regions (based on the arrangement of overlapping windows/shadows) are identified and merged in a top-down process so that no region's shadow is painted or rendered more than once. To accomplish this a shadowbuffer (analogous to a system's framebuffer) may be used to retain windows' alpha information separately from corresponding windows' shadow intensity information.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of window-based operating systems having the benefit of this disclosure.

Figure 1:
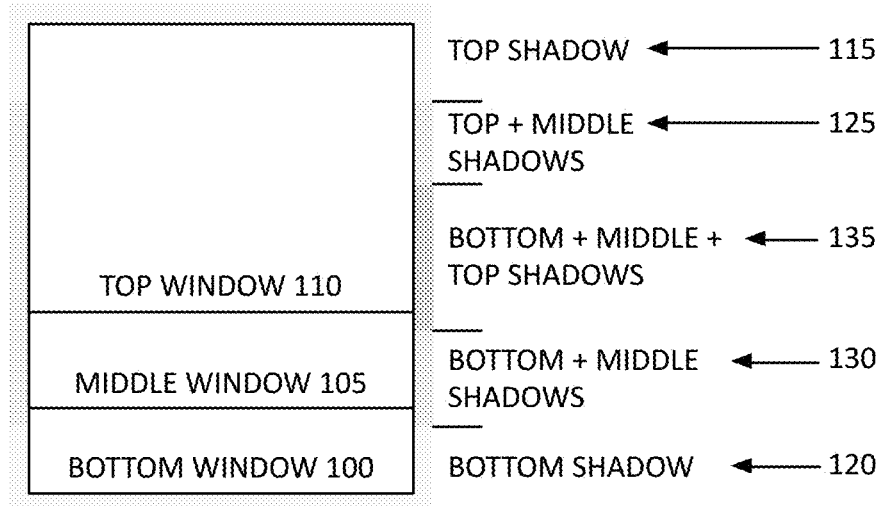
FIG. 1 illustrates the rendering behavior of a prior art windows-based operating system.
Figure 2:
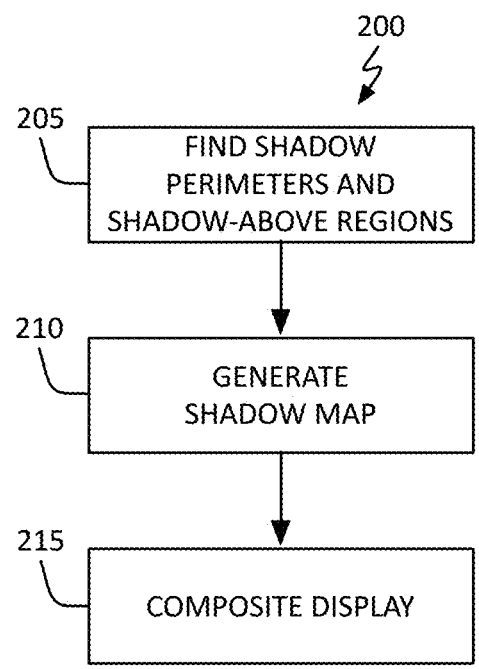
FIG. 2 shows, in flowchart form, unitary shadow operation in accordance with one embodiment.

Referring to FIG. 2, unitary shadow operation 200 in accordance with one embodiment may be a three-phase operation. In a preparation phase, the shapes necessary to distinguish an exterior shadow cast by a collection of windows and one or more internal shadows (e.g., visible shadows cast by one window onto another window). In addition, each window's shadow-above region, if it has one, is determined (block 205). A window's "shadow-above" region corresponds to an area of a display associated with a first window within which the first window's immediately-above window generates a shadow. In one embodiment, the current window's shadow-above region may be determined by identifying the current window's immediately-above window(s). The edge of these windows with respect to the current window may create a starting point from which to generate a blur. While it is general practice to use blurs with a larger diameter when the shadow is cast onto the desktop (as opposed to being cast onto another window), this situation may be taken into account seamlessly in accordance with this disclosure. (See discussion below regarding shadow map operation 400 and FIG. 4.) In a second phase, a shadow intensity (alpha) value may be calculated for each location of each region identified during phase 1 (block 210). Phase two operations may also include identifying a shadow that surrounds the perimeter of the (overlapping) windows. In one embodiment, actions to implement phases 1 and 2 may be performed during a single pass of the windows in a top-most to bottom-most order. These operations may make use of a shadowbuffer—a memory first described here which operates along with, and may have the same dimensions as, a system's standard framebuffer.

Figure 3:
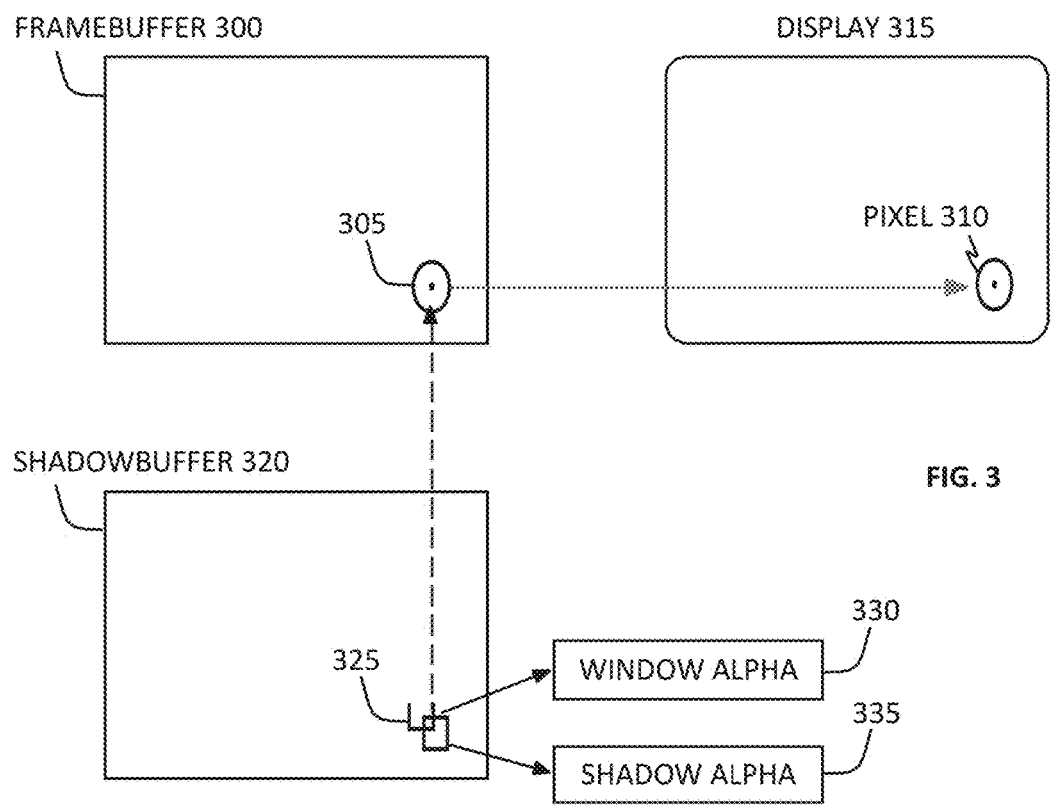
FIG. 3 shows, in block diagram form, a shadowbuffer configuration in accordance with one embodiment.

Referring briefly to FIG. 3, it is generally known that system framebuffer 300 provides a pixel 305 to pixel 310 representation of display 315. In accordance with this disclosure, shadowbuffer 320 provides an element-to-element representation of framebuffer 300 (and therefore to display 315). More specifically, each pixel 305 in framebuffer 300 may have a corresponding element 325 in shadowbuffer 320. As illustrated, each shadowbuffer element 325 may be thought of as having two separate components or channels: alpha channel 330 may be used to store a window's alpha value corresponding to pixel 305's display location (at pixel 310); shadow channel 335, may be used to store an alpha value (shadow intensity) for that window's shadow-above region in accordance with a specified blur operation, also corresponding to pixel 305's display location (at pixel 310).

Returning to FIG. 2, at the end of the second phase of operation (block 210), the shadowbuffer's alpha channel has alpha values corresponding to the set union of the to-be-displayed windows, and the shadowbuffer's shadow channel has alpha (shadow intensity) values in those display areas in which shadows exist. In phase 3 of this illustrative embodiment, windows are processed in a bottom-most to top-most order, with each window's shadow channel values rendered from shadowbuffer 320 into framebuffer 300, where they may be composited for display (block 215).

Figure 4:
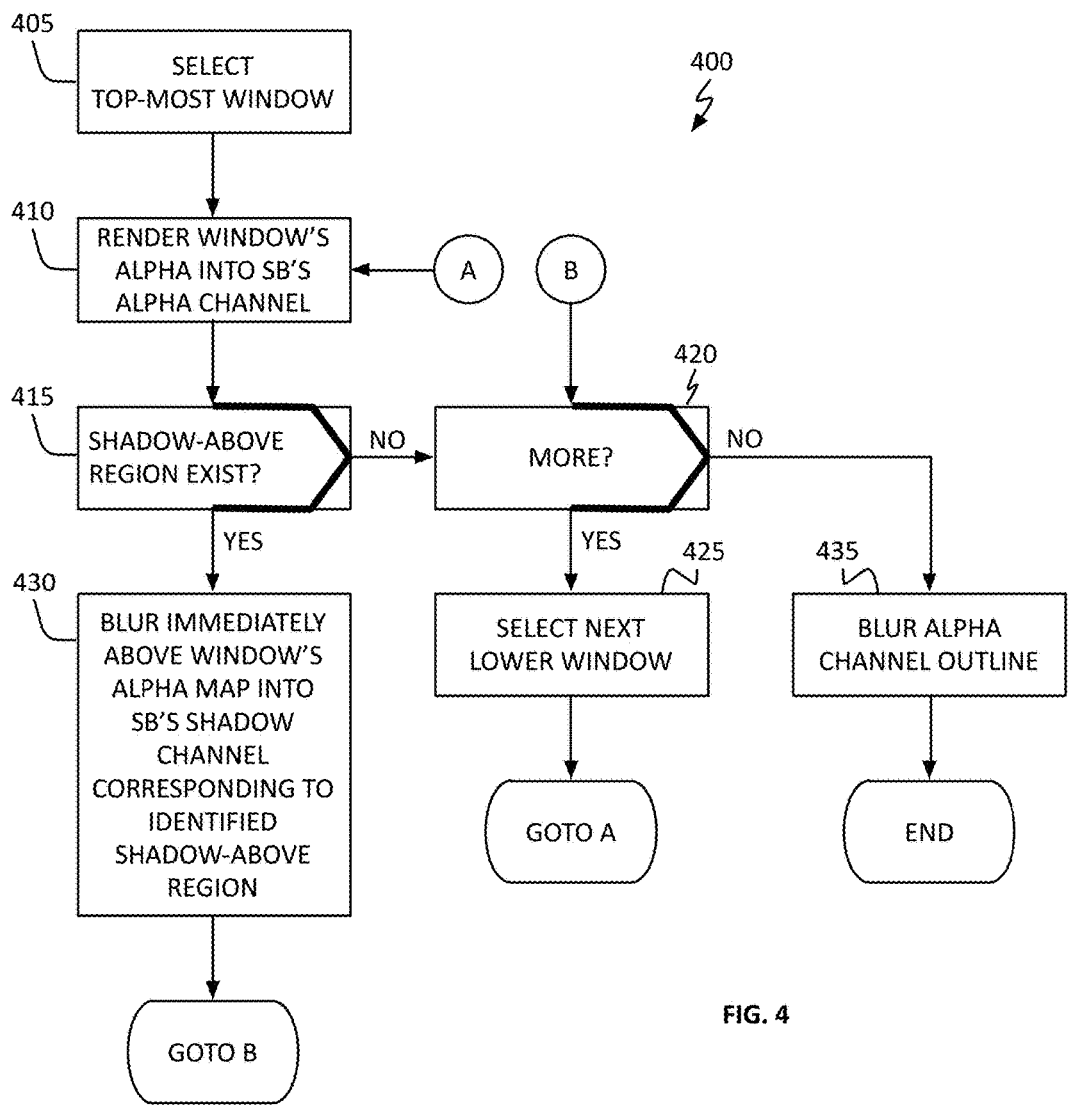
FIG. 4 shows, in flowchart form, a unitary shadow operation in accordance with another embodiment.

As noted above, preparation and shadow map generation phases 205 and 210 may be performed in a single pass through the windows. Referring to FIG. 4, shadow map operation 400 in accordance with one embodiment may begin by selecting the top-most window (block 405) and rendering the window's alpha value into the shadowbuffer's alpha channel (block 410). Since the current (top-most) window cannot have a shadow-above region (the "NO" prong of block 415), a check may be made to determine if additional windows remain to be processed (block 420). If there are (the "YES" prong of block 420), the next lower window may be selected (block 425), where after operation 400 continues at A (block 410). When the current window has a shadow-above region (the "YES" prong of block 415), its corresponding window's alpha value (i.e., the immediate-above window to the current window) may be blurred into the current window's shadow-above region (block 430). In one embodiment, a computer system's central processing unit (CPU) may perform the blur operation. In another embodiment, a computer system's graphics processing unit (GPU) may apply the blur. In the latter implementation, the CPU may provide the GPU the necessary instructions (e.g., shaders) to perform the blur using any capable GPU programming language or application programming language (API) such as, for example, OpenGL®. (OPENGL is a registered trademark of Silicon Graphics International Corporation.) Operation 400 then continues at B (block 420). If all windows have been processed (the "NO" prong of block 420), a blur may be applied to the window outline—into the perimeter's shadow region—now in the shadowbuffer' s alpha channel and placed into the shadowbuffer' s shadow channel—applying the appropriate alpha value from each window (block 435). Actions in accordance with block 435 generate an "outer most" shadow on a display. In some embodiments, an outer most shadow may exhibit a larger radius than other displayed shadows such as those cast on another window. At the end of shadow map operation 400, the shadowbuffer's alpha channel retains a set-union of the windows to be rendered to a display. The shadowbuffer's shadow channel retains an intensity value for each location of a display that displays a shadow region. Shadow generation in accordance with operation 400 renders into each shadow region once (and only once), thereby avoiding the darkening of regions in which multiple shadows overlap.

An illustrative walk through of shadow map operation 400 in accordance with one embodiment is provided by FIG. 5. Referring to FIG. 5A, elements of FIG. 3 are reproduced in the context of displaying 3 overlapping windows. In FIG. 5A, these three windows 500, 510 and 520 and their respective shadows 505, 515 and 525 are shown in display window 530 as they would appear when displayed in accordance with techniques that overlay shadow upon shadow to create dark regions 135. In FIGS. 5B-5E, these same windows/shadows will be processed to create a unitary shadow object in accordance with this disclosure. Finally, in FIG. 5F windows 500, 510 and 510 are shown as they might appear on display 315 after having been generated in accordance with this disclosure.

Processing windows 500, 510 and 520 and their corresponding shadows 505, 515 and 525 in accordance with shadow map operation 400 (FIG. 4) causes the following:

Blocks 405-410 puts top window 500's alpha values into the shadowbuffer's alpha channel 330 at a location corresponding to top window 500 (FIG. 5B); at this time the shadowbuffer's shadow channel 335 is empty (FIG. 5B').

Blocks 415-425 and 410 select and place middle window 510's alpha values into the shadowbuffer's alpha channel 330 at a location corresponding to middle window 510 to create object 540—a union of top and middle windows 505 and 515 (FIG. 5C); during blocks 415 and 430, middle window 510's shadow-above region is identified and shadow intensity values based on top window 500's alpha values and a specified blur diameter may be written into shadowbuffer shadow channel 335 at a location corresponding to the identified shadow-above region to create shadow object 545 (FIG. 5C').

Figure 5A:
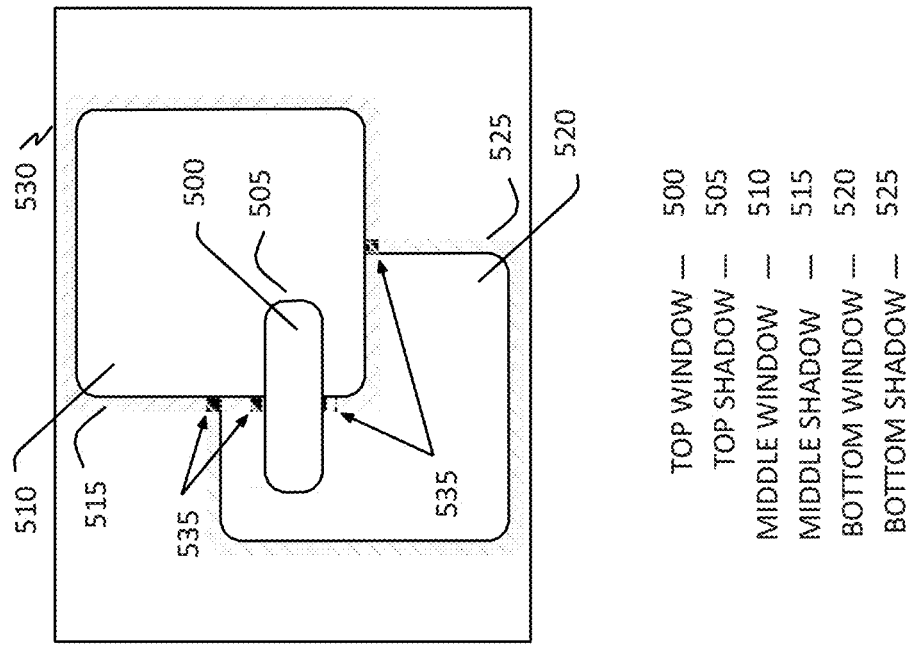
FIGS. 5A, 5B, 5B', 5C, 5C', 5D, 5D', 5E, and 5F illustrate a shadow map operation in accordance with one embodiment.
Figure 5A:
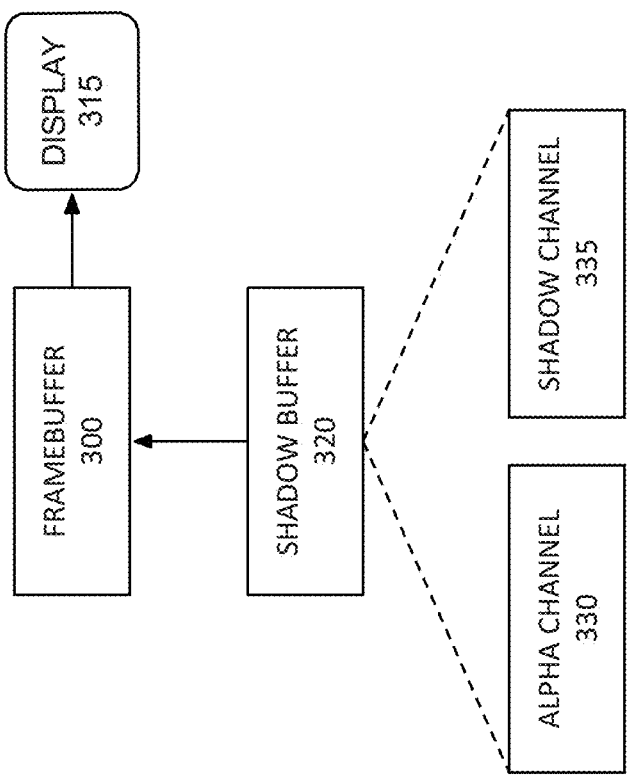
Figure 5D:
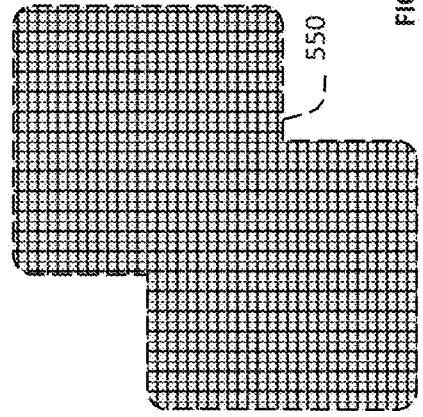
Figure 5D:
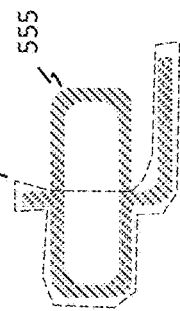

Blocks 420-425 and 410 place bottom window 520's alpha values into the shadowbuffer's alpha channel 330 at a location corresponding to bottom window 520 to create object 550—a union of the top, middle and bottom windows (FIG. 5D); during block 430, bottom window 520's shadow-above region is identified and shadow intensity values based on middle window 510's alpha values and a specified blur diameter may be written into shadowbuffer shadow channel 335 at a location corresponding to the identified shadow-above region to create shadow object 555 (FIG. 5D').

Figure 5E:
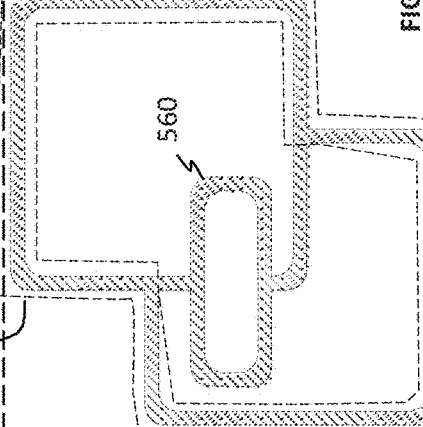

As bottom-most window 520 has been processed, a blur around object 550 in accordance with block 435 may be generated and placed into the shadowbuffer's shadow channel 335 to create unitary shadow object 560 (FIG. 5E). It is significant that at no place along unitary shadow object 560 was any region or pixel rendered to more than once so that overlapping window shadows do not create dark regions on a display.

Figure 5F:
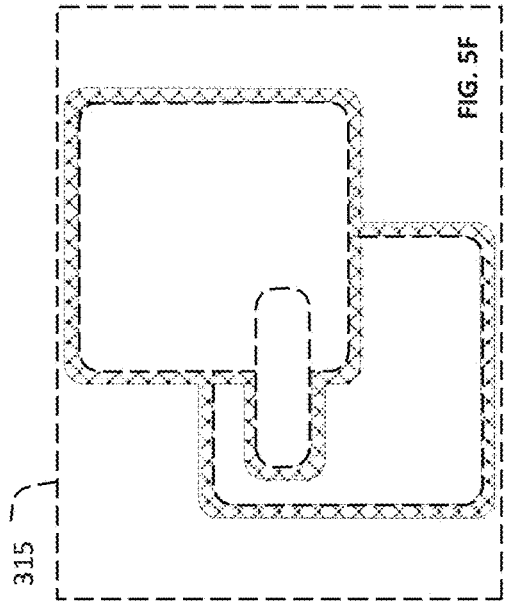

Once unitary shadow object 560 is complete, windows 500, 510 and 520 and unitary shadow object 560 may be rendered to framebuffer 300 and thereafter to display 315 (FIG. 5F).

Unlike prior shadow rendering techniques where each window had its own unique shadow, shadow rendering in accordance with this disclosure generates a single (unitary) shadow object that is pieced together at render time so that no shadow region is rendered more than once. With respect to FIG. 5, the rendered shadow object 560 was generated so that all shadows had the same blur diameter (e.g., the width of all "arms" of 560 are the same). This need not be the case. For example, the shadow around the exterior perimeter of windows (e.g., where the windows' shadow is cast onto the desktop—see block 435 in FIG. 4) may have a different diameter than those around windows whose shadows are cast onto other windows. In addition, while overlapping windows 500, 510 and 520 have been presented as opaque objects, this too is not necessary; windows may have any desired alpha value.

Figure 6:
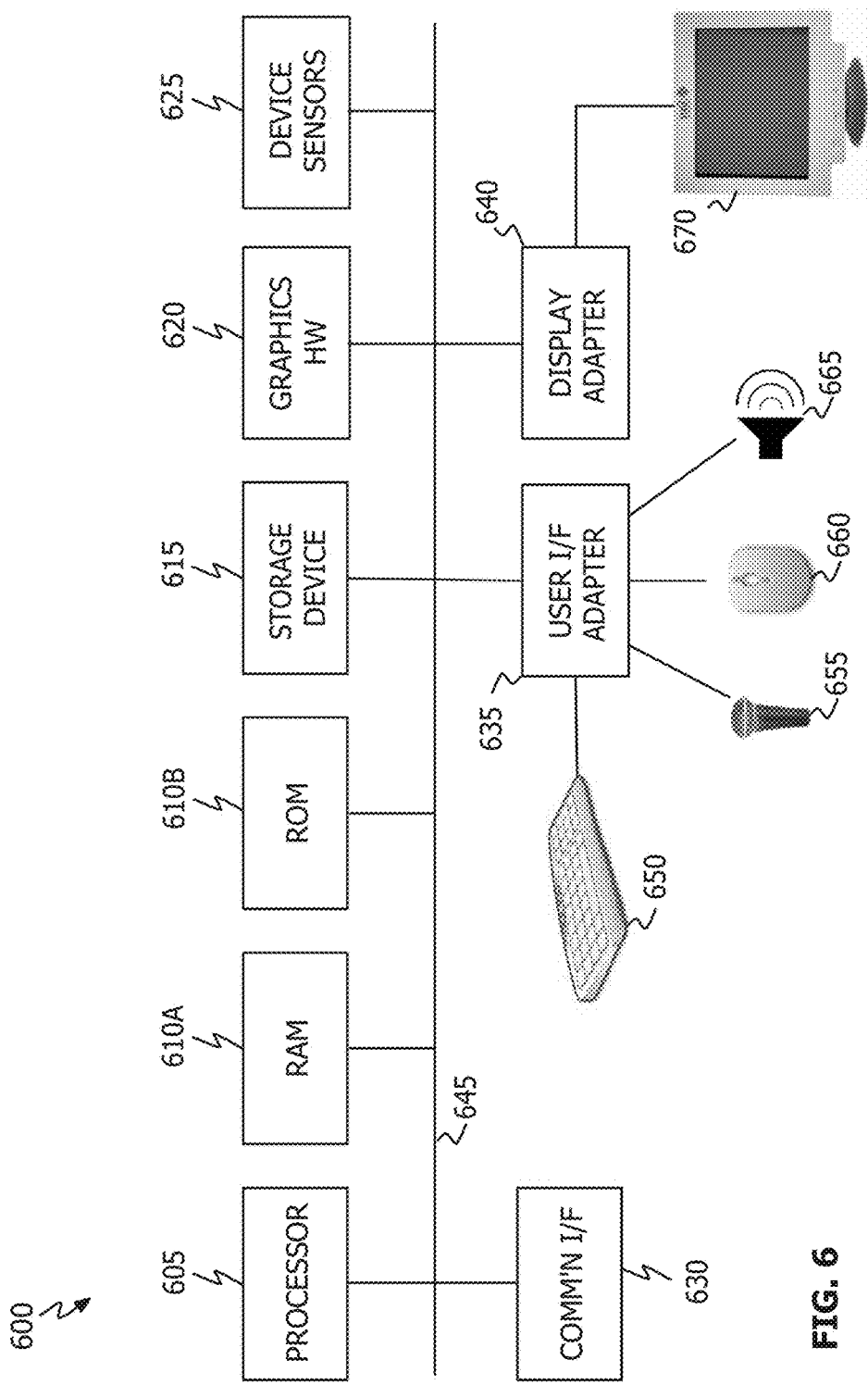
FIG. 6 shows, in block diagram form, a computer system in accordance with one embodiment.

Referring to FIG. 6, representative computer system 600 (e.g., a general purpose computer system or a dedicated image processing workstation) may include one or more processors 605, memory 610 (610A and 610B), one or more storage devices 615, graphics hardware 620, device sensors 625 (e.g., proximity sensor/ambient light sensor, accelerometer and/or gyroscope), communication interface 630, user interface adapter 635 and display adapter 640—all of which may be coupled via system bus or backplane 645. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions organized into one or more modules and written in any desired computer programming language, and any other suitable data. When executed by processor 605 and/or graphics hardware 620 such computer program code may implement one or more of the methods described herein. Communication interface 630 may be used to connect computer system 600 to one or more networks. Illustrative networks include, but are not limited to: a local network such as a USB network; a business' local area network; or a wide area network such as the Internet and may use any suitable technology (e.g., wired or wireless). User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670.

Processor 605 may be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 process graphics information. In one embodiment, graphics hardware 620 may include one or more programmable graphics processing unit (GPU) and other graphics-specific hardware (e.g., custom designed image processing hardware).

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). By way of example, as disclosed herein shadowbuffer 320 is described as if it were a wholly distinct element from framebuffer 300. In some implementations, a single memory bank may be used for both the framebuffer and shadowbuffer; only that memory designated as framebuffer 300 would be outwardly facing (i.e., available to users), while shadowbuffer 320 memory would be available to the windows rendering system. Further, FIGS. 2 and 4 show flowcharts illustrating the generation of a unitary shadow in accordance with the disclosed embodiments. In one or more implementations, one or more of the disclosed steps may be omitted, repeated, and/or performed in a different order than that described herein. Accordingly, the specific arrangement of steps or actions shown in FIGS. 2 and 4 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for rendering shadows for display, comprising:
    identifying a plurality of overlapping windows arranged in an above to below order, each window below a top window having a shadow-above region, a window's shadow-above region comprising that region of the window onto which an overlapping immediately above window would cast a shadow, each shadow-above region having one or more shadow intensity values;
    determining a single perimeter of the plurality of overlapping windows, the single perimeter comprising one or more edges of the plurality of overlapping windows;
    generating a set union of the plurality of overlapping windows whose one or more edges are part of the single perimeter, the set union corresponding to a surface having edges that comprise the single perimeter;
    generating a unitary shadow region corresponding to the set union;
    determining a shadow intensity value for the unitary shadow region; and
    rendering the unitary shadow region's shadow intensity value into a first memory.

2. The method of claim 1, wherein the unitary shadow region's shadow intensity value is rendered no more than once.

3. The method of claim 1, wherein the unitary shadow region comprises a region of a surface onto which the set union would cast a shadow.

4. The method of claim 1, wherein generating the set union comprises rendering each of the plurality of windows whose one or more edges form the single perimeter into a second memory to form the set union.

5. The method of claim 1, wherein determining a shadow intensity value for the unitary shadow region comprises:
    identifying alpha values for each of the windows used for forming the set union; and
    blurring the alpha values of the windows used for forming the set union into the unitary shadow region in accordance with a blur parameter.

6. The method of claim 1, wherein the first memory comprises one or more of a shadowbuffer memory and a framebuffer memory.

7. The method of claim 6, further comprising rendering the first memory into one or more of the shadowbuffer memory and the framebuffer memory.

8. A non-transitory computer-readable storage medium storing instructions, the instructions comprising instructions for rendering shadows for display that are executable by one or more processors to:
    identify a plurality of overlapping windows arranged in an above to below order, each window below a top window having a shadow-above region, a window's shadow-above region comprising that region of the window onto which an overlapping immediately above window would cast a shadow, each shadow-above region having one or more shadow intensity values;

determine a single perimeter of the plurality of overlapping windows, the single perimeter comprising one or more edges of the plurality of overlapping windows;

generate a set union of the plurality of overlapping windows whose one or more edges are part of the single perimeter, the set union corresponding to a surface having edges that comprise the single perimeter;

generate a unitary shadow region corresponding to the set union;

determine a shadow intensity value for the unitary shadow region; and render the unitary shadow region's shadow intensity value into a first memory.

9. The non-transitory computer-readable storage medium of claim 8, wherein the unitary shadow region's shadow intensity value is rendered no more than once.

10. The non-transitory computer-readable storage medium of claim 8, wherein the unitary shadow region comprises a region of a surface onto which the set union would cast a shadow.

11. The non-transitory computer-readable storage medium of claim 8, wherein the instructions executable by the one or more processors to generate the set union comprise instructions executable by the one or more processors to render each of the plurality of windows whose one or more edges form the single perimeter into a second memory to form the set union.

12. The non-transitory computer-readable storage medium of claim 8, wherein the instructions executable by the one or more processors to determine a shadow intensity value for the unitary shadow region comprise instructions executable by the one or more processors to:

identify alpha values for each of the windows used for forming the set union; and blur the alpha values of the windows used for forming the set union into the unitary shadow region in accordance with a blur parameter.

13. The non-transitory computer-readable storage medium of claim 8, wherein the first memory comprises one or more of a shadowbuffer memory and a framebuffer memory.

14. The non-transitory computer-readable storage medium of claim 13, wherein the instructions comprise additional instructions executable by the one or more processors to render the first memory into one or more of the shadowbuffer memory and the framebuffer memory.

15. A system configured for rendering shadows for display, the system comprising:

one or more processors; and a memory coupled to the one or more processors, on which are stored instructions, comprising instructions that when executed by the one or more processors cause at least some of the one or more processors to:

identify a plurality of overlapping windows arranged in an above to below order, each window below a top window having a shadow-above region, a window's shadow-above region comprising that region of the window onto which an overlapping immediately above window would cast a shadow, each shadow-above region having one or more shadow intensity values;

determine a single perimeter of the plurality of overlapping windows, the single perimeter comprising one or more edges of the plurality of overlapping windows;

generate a set union of the plurality of overlapping windows whose one or more edges are part of the single perimeter, the set union corresponding to a surface having edges that comprise the single perimeter;

generate a unitary shadow region corresponding to the set union;

determine a shadow intensity value for the unitary shadow region; and render the unitary shadow region's shadow intensity value into a first memory.

16. The system of claim 15, wherein the unitary shadow region's shadow intensity value is rendered no more than once.

17. The system of claim 15, wherein the unitary shadow region comprises a region of a surface onto which the set union would cast a shadow.

18. The system of claim 15, wherein the instructions that, when executed by the one or more processors, cause at least some of the one or more processors to generate the set union comprise instructions that, when executed by the one or more processors, cause at least some of the one or more processors to render each of the plurality of windows whose one or more edges form the single perimeter into a second memory to form the set union.

19. The system of claim 15, wherein the instructions that, when executed by the one or more processor, cause at least some of the one or more processors to determine a shadow intensity value for the unitary shadow region comprise instructions that, when executed by the one or more processors, cause the at least some of the one or more processors to:

identify alpha values for each of the windows used for forming the set union; and blur the alpha values of the windows used for forming the set union into the unitary shadow region in accordance with a blur parameter.

20. The system of claim 15, wherein the first memory comprises one or more of a shadowbuffer memory and a framebuffer memory.

21. The system of claim 20, wherein the instructions further comprise instructions that when executed by the one or more processors cause at least some of the one or more processors to render the first memory into one or more of the shadowbuffer memory and the framebuffer memory.

* * * * *

UNITED STATES PATENT AND TRADEMARK OFFICE
CERTIFICATE OF CORRECTION

PATENT NO. : 10,013,776 B2
APPLICATION NO. : 15/587869
DATED : July 3, 2018
INVENTOR(S) : James J. Shearer et al.

It is certified that error appears in the above-identified patent and that said Letters Patent is hereby corrected as shown below:

In the Claims

Claim number 19, at Column 8, Line number 37, "when executed by the one or more processor, cause at least" should be changed to -- when executed by the one or more processors, cause at least --

Claim number 19, at Column 8, Line numbers 41-42, "more processors, cause the at least some of the one or more processors" should be changed to -- more processors, cause at least some of the one or more processors --

Signed and Sealed this
Eighteenth Day of September, 2018

Andrei Iancu
*Director of the United States Patent and Trademark Office*